United States Patent
Sun et al.

(10) Patent No.: US 12,525,972 B2
(45) Date of Patent: Jan. 13, 2026

(54) INTERLEAVED SAMPLING CIRCUIT

(71) Applicant: QUALCOMM Incorporated, San Diego, CA (US)

(72) Inventors: Lei Sun, San Diego, CA (US); Behnam Sedighi, La Jolla, CA (US); Honghao Ji, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 49 days.

(21) Appl. No.: 18/409,209

(22) Filed: Jan. 10, 2024

(65) Prior Publication Data

US 2025/0226822 A1    Jul. 10, 2025

(51) Int. Cl.
*H03K 17/00*   (2006.01)
*H03K 17/56*   (2006.01)
*H03K 19/20*   (2006.01)

(52) U.S. Cl.
CPC ............. *H03K 17/56* (2013.01); *H03K 19/20* (2013.01)

(58) Field of Classification Search
CPC ..... G11C 27/02; G11C 27/026; G11C 27/024; H03K 17/063
See application file for complete search history.

(56) References Cited

U.S. PATENT DOCUMENTS

| | | | |
|---|---|---|---|
| 6,215,348 B1* | 4/2001 | Steensgaard-Madsen | H03K 17/063 327/390 |
| 7,015,729 B1* | 3/2006 | Tursi | G11C 27/024 327/94 |
| 7,453,291 B2* | 11/2008 | Song | H03K 17/063 327/91 |
| 7,940,091 B1* | 5/2011 | Govindarajulu | H03K 17/063 327/91 |
| 10,720,911 B2* | 7/2020 | Shin | H02M 3/073 |
| 2007/0172013 A1* | 7/2007 | Naviasky | H03K 9/06 375/376 |
| 2024/0120917 A1* | 4/2024 | Trampitsch | H03K 17/063 |
| 2024/0364325 A1* | 10/2024 | Sun | H03K 17/162 |

OTHER PUBLICATIONS

Duan Y., "Design Techniques for Ultra-High-Speed Time-Interleaved Analog-to-Digital Converters (ADCs)", Electrical Engineering and Computer Sciences, May 1, 2017, 82 Pages.

* cited by examiner

*Primary Examiner* — Tuan T Lam
(74) *Attorney, Agent, or Firm* — Patterson + Sheridan, L.L.P.

(57) ABSTRACT

Certain aspects of the present disclosure are directed towards an interleaved sampling circuit. The interleaved sampling circuit generally includes: a clock generator having an input coupled to a main clock node and having a plurality of non-overlapping clock output nodes; and a plurality of sampling circuits, each of the plurality of sampling circuits having a first clock input coupled to a respective one of the non-overlapping clock output nodes and a second clock input coupled to the main clock node.

19 Claims, 9 Drawing Sheets

INTERLEAVED SAMPLING CIRCUIT

TECHNICAL FIELD

Certain aspects of the present disclosure generally relate to electronic circuits and, more particularly, to techniques and apparatus for interleaved sampling.

BACKGROUND

Wireless communication devices are widely deployed to provide various communication services such as telephony, video, data, messaging, broadcasts, and so on. Such wireless communication devices may transmit and/or receive radio frequency (RF) signals via any of various suitable radio access technologies (RATs) including, but not limited to, 5G New Radio (NR), Long Term Evolution (LTE), Code Division Multiple Access (CDMA), Time Division Multiple Access (TDMA), Wideband CDMA (WCDMA), Global System for Mobility (GSM), Bluetooth, Bluetooth Low Energy (BLE), ZigBee, wireless local area network (WLAN) RATs (e.g., WiFi), and the like.

A wireless communication network may include a number of base stations that can support communication for a number of mobile stations. A mobile station (MS) may communicate with a base station (BS) via a downlink and an uplink. The downlink (or forward link) refers to the communication link from the base station to the mobile station, and the uplink (or reverse link) refers to the communication link from the mobile station to the base station. A base station may transmit data and control information on the downlink to a mobile station and/or may receive data and control information on the uplink from the mobile station. The base station and/or mobile station may include one or more analog-to-digital converters. The analog-to-digital converters may be implemented using interleaved sampling.

SUMMARY

The systems, methods, and devices of the disclosure each have several aspects, no single one of which is solely responsible for its desirable attributes. Without limiting the scope of this disclosure as expressed by the claims which follow, some features will now be discussed briefly. After considering this discussion, and particularly after reading the section entitled "Detailed Description," one will understand how the features of this disclosure provide advantages that include increased conversion speed.

Certain aspects of the present disclosure are directed towards an interleaved sampling circuit. The interleaved sampling circuit generally includes: a clock generator having an input coupled to a main clock node and having a plurality of non-overlapping clock output nodes; and a plurality of sampling circuits, each of the plurality of sampling circuits having a first clock input coupled to a respective one of the non-overlapping clock output nodes and a second clock input coupled to the main clock node.

Certain aspects of the present disclosure are directed towards an interleaved sampling circuit. The interleaved sampling circuit generally includes: a clock generator configured to generate non-overlapping clock signals based on a main clock signal; and a plurality of sampling circuits, each of the plurality of sampling circuits being configured to: receive a respective one of the non-overlapping clock signals and the main clock signal; and sample an input voltage based on the respective one of the non-overlapping clock signals and the main clock signal.

Certain aspects of the present disclosure are directed towards a method for interleaved sampling. The method generally includes: generating, via a clock generator, non-overlapping clock signals based on a main clock signal; receiving, via each of a plurality of sampling circuits, a respective one of the non-overlapping clock signals and the main clock signal; and sampling, via each of the plurality of sampling circuits, an input voltage based on the respective one of the non-overlapping clock signals and the main clock signal.

To the accomplishment of the foregoing and related ends, the one or more aspects comprise the features hereinafter fully described and particularly pointed out in the claims. The following description and the annexed drawings set forth in detail certain illustrative features of the one or more aspects. These features are indicative, however, of but a few of the various ways in which the principles of various aspects may be employed, and this description is intended to include all such aspects and their equivalents.

BRIEF DESCRIPTION OF THE DRAWINGS

So that the manner in which the above-recited features of the present disclosure can be understood in detail, a more particular description, briefly summarized above, may be had by reference to aspects, some of which are illustrated in the appended drawings. It is to be noted, however, that the appended drawings illustrate only certain typical aspects of this disclosure and are therefore not to be considered limiting of its scope, for the description may admit to other equally effective aspects.

To facilitate understanding, identical reference numerals have been used, where possible, to designate identical elements that are common to the figures. It is contemplated that elements disclosed in one aspect may be beneficially utilized on other aspects without specific recitation.

DETAILED DESCRIPTION

Figure 1:
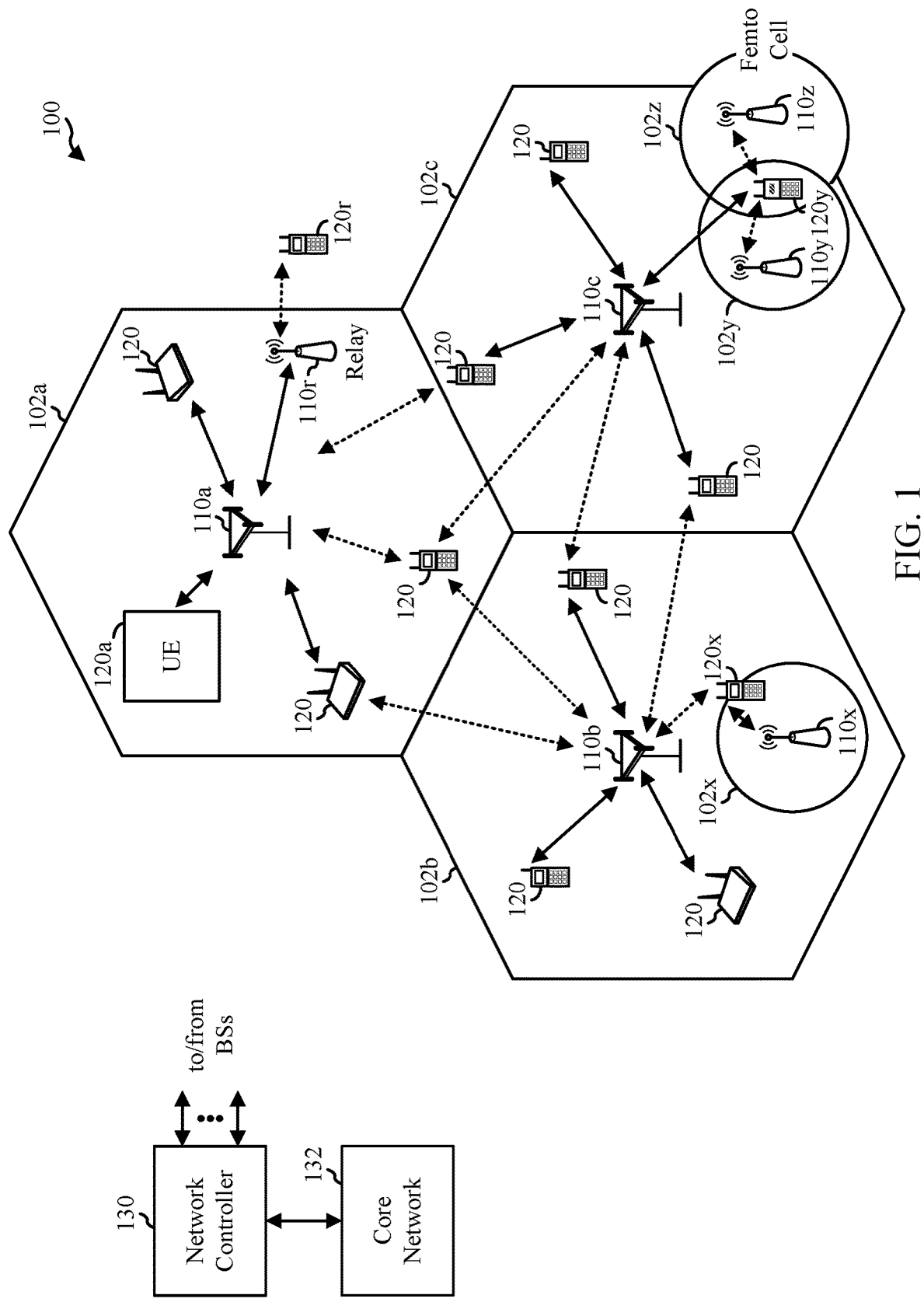
FIG. 1 is a diagram of an example wireless communications network, in which aspects of the present disclosure may be practiced.

Certain aspects of the present disclosure are directed towards circuitry and techniques for performing interleaved sampling. For example, an input voltage may be sampled by different sampling circuits in an interleaved manner. The sampled input voltages may be converted to a digital signal to implement an analog-to-digital converter (ADC) with increased conversion speed. While analog-to-digital conversion is one example application for interleaved sampling, the techniques described herein may be used in any suitable application.

In some aspects, each sampling circuit may receive a respective one of non-overlapping clock signals (ckout<0> and ckout<1>) as well as a main clock signal used to generate the non-overlapping clock signals. The non-overlapping clock signal may be used to select a portion of the main clock signal to be used as a final sampling edge for each sampling circuit. In other words, an output clock signal may be generated corresponding to a portion of a pulse of the main clock signal as selected based on the non-overlapping clock signal. The output clock signal may be used to open and close a sampling switch used to sample an input voltage onto a capacitive element. The final sampling edge may refer to a falling edge of the output clock signal used to open the sampling switch after the input voltage has been sampled. With the final sampling edge for each sampling circuit being based more directly on the main clock signal, the effect of logic mismatch between ckout<0> and ckout<1> on the interleaved sampling is reduced. While some aspects are described with respect to interleaved sampling with two channels, any number of multiple channels may be used. Certain aspects reduce the clock skew between time-interleaved channels with less hardware and power penalty as compared to some conventional implementations. In some cases, a more direct routing tree may be used to route the main clock to the sampling circuits to provide a high-quality (e.g., with a low fall time and/or less jitter) main clock sampling edge.

Various aspects of the disclosure are described more fully hereinafter with reference to the accompanying drawings. This disclosure may, however, be embodied in many different forms and should not be construed as limited to any specific structure or function presented throughout this disclosure. Rather, these aspects are provided so that this disclosure will be thorough and complete, and will fully convey the scope of the disclosure to those skilled in the art. Based on the teachings herein one skilled in the art should appreciate that the scope of the disclosure is intended to cover any aspect of the disclosure disclosed herein, whether implemented independently of or combined with any other aspect of the disclosure. For example, an apparatus may be implemented or a method may be practiced using any number of the aspects set forth herein. In addition, the scope of the disclosure is intended to cover such an apparatus or method which is practiced using other structure, functionality, or structure and functionality in addition to or other than the various aspects of the disclosure set forth herein. It should be understood that any aspect of the disclosure disclosed herein may be embodied by one or more elements of a claim.

The word "exemplary" is used herein to mean "serving as an example, instance, or illustration." Any aspect described herein as "exemplary" is not necessarily to be construed as preferred or advantageous over other aspects.

As used herein, the term "connected with" in the various tenses of the verb "connect" may mean that element A is directly connected to element B or that other elements may be connected between elements A and B (i.e., that element A is indirectly connected with element B). In the case of electrical components, the term "connected with" may also be used herein to mean that a wire, trace, or other electrically conductive material is used to electrically connect elements A and B (and any components electrically connected therebetween).

An Example Wireless System

FIG. 1 illustrates an example wireless communications network 100, in which aspects of the present disclosure may be practiced. For example, the wireless communications network 100 may be a New Radio (NR) system (e.g., a Fifth Generation (5G) NR network), an Evolved Universal Terrestrial Radio Access (E-UTRA) system (e.g., a Fourth Generation (4G) network), a Universal Mobile Telecommunications System (UMTS) (e.g., a Second Generation/Third Generation (2G/3G) network), or a code division multiple access (CDMA) system (e.g., a 2G/3G network), or may be configured for communications according to an IEEE standard such as one or more of the 802.11 standards, etc.

As illustrated in FIG. 1, the wireless communications network 100 may include a number of base stations (BSs) 110a-z (each also individually referred to herein as "BS 110" or collectively as "BSs 110") and other network entities. A BS may also be referred to as an access point (AP), an evolved Node B (eNodeB or eNB), a next generation Node B (gNodeB or gNB), or some other terminology.

A BS 110 may provide communication coverage for a particular geographic area, sometimes referred to as a "cell," which may be stationary or may move according to the location of a mobile BS. In some examples, the BSs 110 may be interconnected to one another and/or to one or more other BSs or network nodes (not shown) in wireless communications network 100 through various types of backhaul interfaces (e.g., a direct physical connection, a wireless connection, a virtual network, or the like) using any suitable transport network. In the example shown in FIG. 1, the BSs 110a, 110b, and 110c may be macro BSs for the macro cells 102a, 102b, and 102c, respectively. The BS 110x may be a pico BS for a pico cell 102x. The BSs 110y and 110z may be femto BSs for the femto cells 102y and 102z, respectively. A BS may support one or multiple cells.

The BSs 110 communicate with one or more user equipment's (UEs) 120a-y (each also individually referred to herein as "UE 120" or collectively as "UEs 120") in the wireless communications network 100. A UE may be fixed or mobile and may also be referred to as a user terminal (UT), a mobile station (MS), an access terminal, a station (STA), a client, a wireless device, a mobile device, or some other terminology. A user terminal may be a wireless device, such as a cellular phone, a smartphone, a personal digital assistant (PDA), a handheld device, a wearable device, a wireless modem, a laptop computer, a tablet, a personal computer, etc.

The BSs 110 are considered transmitting entities for the downlink and receiving entities for the uplink. The UEs 120 are considered transmitting entities for the uplink and receiving entities for the downlink. As used herein, a "transmitting entity" is an independently operated apparatus or device capable of transmitting data via a frequency channel, and a "receiving entity" is an independently operated apparatus or device capable of receiving data via a frequency channel. In the following description, the subscript "dn" denotes the downlink, the subscript "up" denotes the uplink. $N_{up}$ UEs may be selected for simultaneous transmission on the uplink, Nan UEs may be selected for simultaneous transmission on the downlink. $N_{up}$ may or may not be equal to Nan, and $N_{up}$ and Nan may be static values or can change for each scheduling interval. Beam-steering or some other spatial processing technique may be used at the BSs 110 and/or UEs 120.

The UEs 120 (e.g., 120x, 120y, etc.) may be dispersed throughout the wireless communications network 100, and each UE 120 may be stationary or mobile. The wireless communications network 100 may also include relay stations (e.g., relay station 110r), also referred to as relays or the like, that receive a transmission of data and/or other information from an upstream station (e.g., a BS 110a or a UE 120r) and send a transmission of the data and/or other information to a downstream station (e.g., a UE 120 or a BS 110), or that relays transmissions between UEs 120, to facilitate communication between devices.

The BSs 110 may communicate with one or more UEs 120 at any given moment on the downlink and uplink. The downlink (i.e., forward link) is the communication link from the BSs 110 to the UEs 120, and the uplink (i.e., reverse link) is the communication link from the UEs 120 to the BSs 110. A UE 120 may also communicate peer-to-peer with another UE 120.

The wireless communications network 100 may use multiple transmit and multiple receive antennas for data transmission on the downlink and uplink. BSs 110 may be equipped with a number $N_{ap}$ of antennas to achieve transmit diversity for downlink transmissions and/or receive diversity for uplink transmissions. A set Nu of UEs 120 may receive downlink transmissions and transmit uplink transmissions. Each UE 120 may transmit user-specific data to and/or receive user-specific data from the BSs 110. In general, each UE 120 may be equipped with one or multiple antennas. The Nu UEs 120 can have the same or different numbers of antennas.

The wireless communications network 100 may be a time division duplex (TDD) system or a frequency division duplex (FDD) system. For a TDD system, the downlink and uplink share the same frequency band. For an FDD system, the downlink and uplink use different frequency bands. The wireless communications network 100 may also utilize a single carrier or multiple carriers for transmission. Each UE 120 may be equipped with a single antenna (e.g., to keep costs down) or multiple antennas (e.g., where the additional cost can be supported).

A network controller 130 (also sometimes referred to as a "system controller") may be in communication with a set of BSs 110 and provide coordination and control for these BSs 110 (e.g., via a backhaul). In certain cases (e.g., in a 5G NR system), the network controller 130 may include a centralized unit (CU) and/or a distributed unit (DU). In certain aspects, the network controller 130 may be in communication with a core network 132 (e.g., a 5G Core Network (5GC)), which provides various network functions such as Access and Mobility Management, Session Management, User Plane Function, Policy Control Function, Authentication Server Function, Unified Data Management, Application Function, Network Exposure Function, Network Repository Function, Network Slice Selection Function, etc.

In certain aspects of the present disclosure, the BSs 110 and/or the UEs 120 may include an analog-to-digital converter (ADC) that may be implemented using interleaved sampling, as described in more detail herein.

Figure 2:
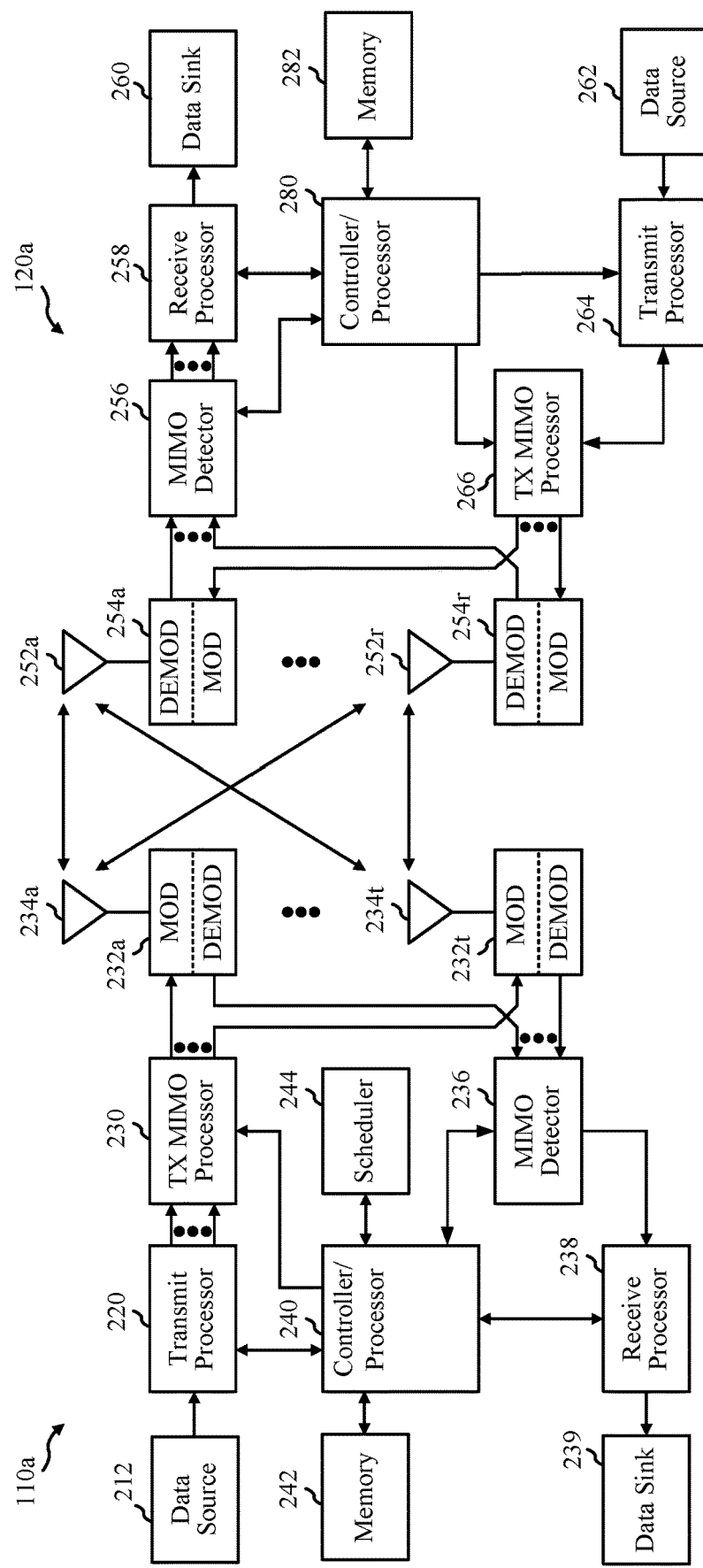
FIG. 2 is a block diagram conceptually illustrating a design of an example base station (BS) and user equipment (UE), in which aspects of the present disclosure may be practiced.

FIG. 2 illustrates example components of BS 110a and UE 120a (e.g., from the wireless communications network 100 of FIG. 1), in which aspects of the present disclosure may be implemented.

On the downlink, at the BS 110a, a transmit processor 220 may receive data from a data source 212, control information from a controller/processor 240, and/or possibly other data (e.g., from a scheduler 244). The various types of data may be sent on different transport channels. For example, the control information may be designated for the physical broadcast channel (PBCH), physical control format indicator channel (PCFICH), physical hybrid automatic repeat request (HARQ) indicator channel (PHICH), physical downlink control channel (PDCCH), group common PDCCH (GC PDCCH), etc. The data may be designated for the physical downlink shared channel (PDSCH), etc. A medium access control (MAC)-control element (MAC-CE) is a MAC layer communication structure that may be used for control command exchange between wireless nodes. The MAC-CE may be carried in a shared channel such as a PDSCH, a physical uplink shared channel (PUSCH), or a physical sidelink shared channel (PSSCH).

The processor 220 may process (e.g., encode and symbol map) the data and control information to obtain data symbols and control symbols, respectively. The transmit processor 220 may also generate reference symbols, such as for the primary synchronization signal (PSS), secondary synchronization signal (SSS), PBCH demodulation reference signal (DMRS), and channel state information reference signal (CSI-RS).

A transmit (TX) multiple-input, multiple-output (MIMO) processor 230 may perform spatial processing (e.g., precoding) on the data symbols, the control symbols, and/or the reference symbols, if applicable, and may provide output symbol streams to the modulators (MODs) in transceivers 232a-232t. Each modulator in transceivers 232a-232t may process a respective output symbol stream (e.g., for orthogonal frequency division multiplexing (OFDM), etc.) to obtain an output sample stream. Each of the transceivers 232a-232t may further process (e.g., convert to analog, amplify, filter, and upconvert) the output sample stream to obtain a downlink signal. Downlink signals from the transceivers 232a-232t may be transmitted via the antennas 234a-234t, respectively.

At the UE 120a, the antennas 252a-252r may receive the downlink signals from the BS 110a and may provide received signals to the transceivers 254a-254r, respectively. The transceivers 254a-254r may condition (e.g., filter, amplify, downconvert, and digitize) a respective received signal to obtain input samples. Each demodulator (DEMOD) in the transceivers 232a-232t may further process the input samples (e.g., for OFDM, etc.) to obtain received symbols. A MIMO detector 256 may obtain received symbols from the demodulators in transceivers 254a-254r, perform MIMO detection on the received symbols if applicable, and provide detected symbols. A receive processor 258 may process (e.g., demodulate, deinterleave, and decode) the detected symbols, provide decoded data for the UE 120a to a data sink 260, and provide decoded control information to a controller/processor 280.

On the uplink, at UE 120a, a transmit processor 264 may receive and process data (e.g., for the physical uplink shared channel (PUSCH)) from a data source 262 and control information (e.g., for the physical uplink control channel (PUCCH)) from the controller/processor 280. The transmit processor 264 may also generate reference symbols for a reference signal (e.g., the sounding reference signal (SRS)). The symbols from the transmit processor 264 may be precoded by a TX MIMO processor 266 if applicable, further processed by the modulators (MODs) in transceivers 254a-254r (e.g., for single-carrier frequency division multiplexing (SC-FDM), etc.), and transmitted to the BS 110a. At the BS 110a, the uplink signals from the UE 120a may be received by the antennas 234, processed by the demodulators in transceivers 232a-232t, detected by a MIMO detector 236 if applicable, and further processed by a receive processor 238 to obtain decoded data and control information sent by the UE 120a. The receive processor 238 may provide the decoded data to a data sink 239 and the decoded control information to the controller/processor 240.

The memories 242 and 282 may store data and program codes for BS 110a and UE 120a, respectively. The memories 242 and 282 may also interface with the controllers/processors 240 and 280, respectively. A scheduler 244 may schedule UEs for data transmission on the downlink and/or uplink.

In certain aspects of the present disclosure, the transceivers 232 and/or the transceivers 254 may include an ADC that may be implemented using interleaved sampling, as described in more detail herein.

NR may utilize orthogonal frequency division multiplexing (OFDM) with a cyclic prefix (CP) on the uplink and downlink. NR may support half-duplex operation using time division duplexing (TDD). OFDM and single-carrier frequency division multiplexing (SC-FDM) partition the system bandwidth into multiple orthogonal subcarriers, which are also commonly referred to as tones, bins, etc. Each subcarrier may be modulated with data. Modulation symbols may be sent in the frequency domain with OFDM and in the time domain with SC-FDM. The spacing between adjacent subcarriers may be fixed, and the total number of subcarriers may be dependent on the system bandwidth. The system bandwidth may also be partitioned into subbands. For example, a subband may cover multiple resource blocks (RBs).

Example RF Transceiver

Figure 3:
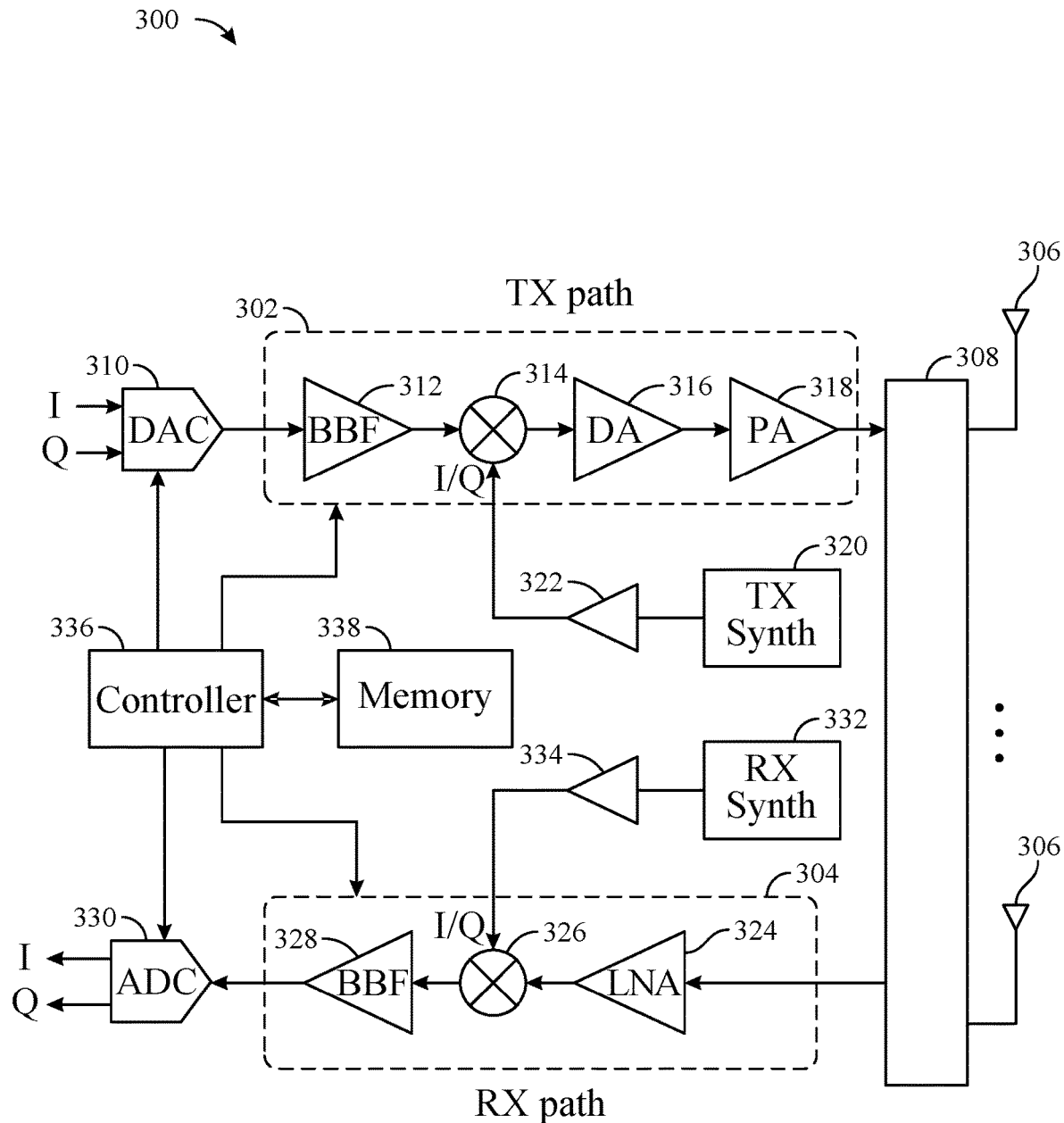
FIG. 3 is a block diagram of an example radio frequency (RF) transceiver, in which aspects of the present disclosure may be practiced.

FIG. 3 is a block diagram of an example radio frequency (RF) transceiver circuit 300, in accordance with certain aspects of the present disclosure. The RF transceiver circuit 300 includes at least one transmit (TX) path 302 (also known as a "transmit chain") for transmitting signals via one or more antennas 306 and at least one receive (RX) path 304 (also known as a "receive chain") for receiving signals via the antennas 306. When the TX path 302 and the RX path 304 share an antenna 306, the paths may be connected with the antenna via an interface 308, which may include any of various suitable RF devices, such as a switch, a duplexer, a diplexer, a multiplexer, and the like.

Receiving in-phase (I) and/or quadrature (Q) baseband analog signals from a digital-to-analog converter (DAC) 310, the TX path 302 may include a baseband filter (BBF) 312, a mixer 314, a driver amplifier (DA) 316, and a power amplifier (PA) 318. The BBF 312, the mixer 314, the DA 316, and the PA 318 may be included in a radio frequency integrated circuit (RFIC). For certain aspects, the PA 318 may be external to the RFIC.

The BBF 312 filters the baseband signals received from the DAC 310, and the mixer 314 mixes the filtered baseband signals with a transmit local oscillator (LO) signal to convert the baseband signal of interest to a different frequency (e.g., upconvert from baseband to a radio frequency). This frequency-conversion process produces the sum and difference frequencies between the LO frequency and the frequencies of the baseband signal of interest. The sum and difference frequencies are referred to as the "beat frequencies." The beat frequencies are typically in the RF range, such that the signals output by the mixer 314 are typically RF signals, which may be amplified by the DA 316 and/or by the PA 318 before transmission by the antenna(s) 306. While one mixer 314 is illustrated, several mixers may be used to upconvert the filtered baseband signals to one or more intermediate frequencies and to thereafter upconvert the intermediate frequency (IF) signals to a frequency for transmission.

The RX path 304 may include a low noise amplifier (LNA) 324, a mixer 326, and a baseband filter (BBF) 328. The LNA 324, the mixer 326, and the BBF 328 may be included in one or more RFICs, which may or may not be the same RFIC that includes the TX path components. RF signals received via the antenna(s) 306 may be amplified by the LNA 324, and the mixer 326 mixes the amplified RF signals with a receive local oscillator (LO) signal to convert the RF signal of interest to a different baseband frequency (e.g., downconvert). The baseband signals output by the mixer 326 may be filtered by the BBF 328 before being converted by an analog-to-digital converter (ADC) 330 to digital I and/or Q signals for digital signal processing. In some aspects, the ADC may be implemented using interleaved sampling, as described in more detail herein.

Certain transceivers may employ frequency synthesizers with a variable-frequency oscillator (e.g., a voltage-controlled oscillator (VCO) or a digitally controlled oscillator (DCO)) to generate a stable, tunable LO with a particular tuning range. Thus, the transmit LO may be produced by a TX frequency synthesizer 320, which may be buffered or amplified by amplifier 322 before being mixed with the baseband signals in the mixer 314. Similarly, the receive LO may be produced by an RX frequency synthesizer 332, which may be buffered or amplified by amplifier 334 before being mixed with the RF signals in the mixer 326. For certain aspects, a single frequency synthesizer may be used for both the TX path 302 and the RX path 304. In certain aspects, the TX frequency synthesizer 320 and/or RX frequency synthesizer 332 may include a frequency multiplier, such as a frequency doubler, that is driven by an oscillator (e.g., a VCO) in the frequency synthesizer.

A controller 336 (e.g., controller/processor 280 in FIG. 2) may direct the operation of the RF transceiver circuit 300A, such as transmitting signals via the TX path 302 and/or receiving signals via the RX path 304. The controller 336 may be a processor, a digital signal processor (DSP), an application-specific integrated circuit (ASIC), a field-programmable gate array (FPGA) or other programmable logic device (PLD), discrete gate or transistor logic, discrete hardware components, or any combination thereof. A memory 338 (e.g., memory 282 in FIG. 2) may store data and/or program codes for operating the RF transceiver circuit 300. The controller 336 and/or the memory 338 may include control logic (e.g., complementary metal-oxide-semiconductor (CMOS) logic).

While FIGS. 1-3 provide wireless communications as an example application in which certain aspects of the present disclosure may be implemented to facilitate understanding, certain aspects described herein may be used for any of various other suitable systems.

Example Interleaved Sampling Techniques

Certain aspects of the present disclosure are directed towards techniques for performing interleaved sampling, which may be used to increase the conversion speed for data converters (e.g., analog-to-digital converters). For example, some aspects present time-interleaved sampling circuitry with reduced timing skew as compared to some conventional implementations.

Figure 4:
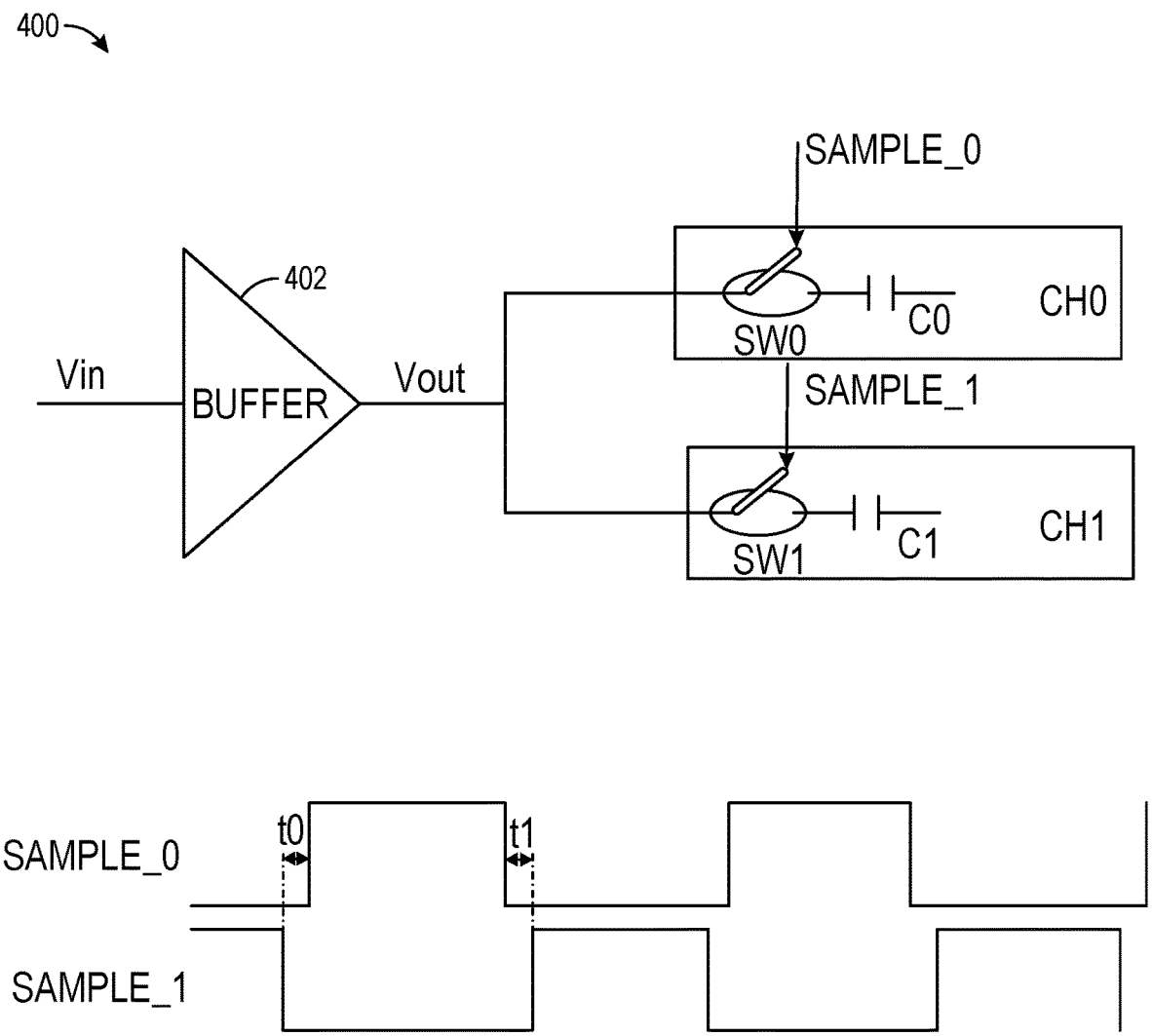
FIG. 4 illustrates a sampling circuit implemented using time interleaving with multiple channels.

FIG. 4 illustrates a sampling circuit 400 implemented using time interleaving with multiple channels (labeled "CH0" and "CH1"). While two channels are shown to facilitate understanding, any number of channels may be used. As shown, an input voltage (Vin) may be buffered via buffer 402 to generate an output voltage (Vout). Vout may be provided to CH0 and CH1, each having a switch (e.g., switch SW0 for CH0 and switch SW1 for CH1) that may be closed to sample Vout on a capacitive element (e.g., capacitive element C0 for CH0 and capacitive element C1 for CH1). Switch SW0 may be controlled via a sample signal labeled "SAMPLE_0," and switch SW1 may be controlled via a sample signal labeled "SAMPLE_1." The sample signals may be non-overlapping signals. In other words, SAMPLE_0 transitions from logic low to logic high only a time period t0 after SAMPLE_1 has transitioned from logic high to logic low. Similarly, SAMPLE_1 transitions from logic low to logic high only a time period t1 after SAMPLE_0 has transitioned from logic high to logic low. In some aspects, the sampled voltage may be converted to a digital signal via a quantizer for each channel.

Time interleaving techniques may suffer from mismatches between the multiple channels, with respect to gain and/or timing. The mismatch may corrupt the output spectrum of the quantizer (e.g., quantizing the voltage sample on each channel) and introduce spurs and unwanted images of signals at multiples of fs/m, fs being the sampling frequency (e.g., frequency of SAMPLE_0 or SAMPLE_1) and m being the number of time interleaved channels. Gain estimation (and correction) may be performed in the digital domain. For timing skew, timing calibration may be estimated in the digital domain, but timing skew errors as estimated may be compensated for between different channels either in the analog or digital domain. In some cases, the correction may be completed once (e.g., at room temperature), but the estimated correction may drift due to changes in temperature, especially for timing skews. Even more complicated online calibration may be performed to address temperature drift errors. In many existing implementations, calibrations for the timing calibration depend on the estimation and correction resolution accuracy.

Figure 5:
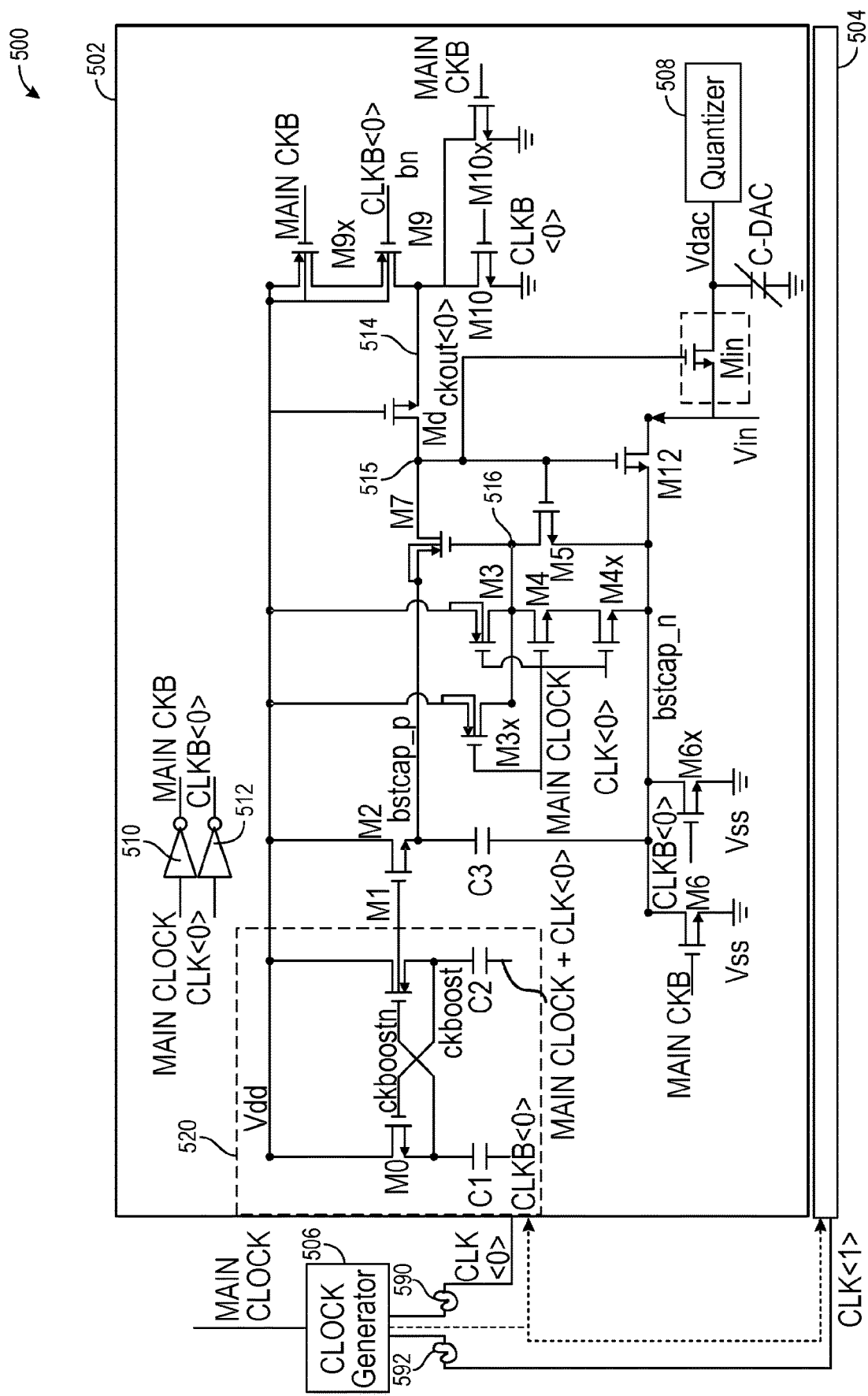
FIG. 5 illustrates an example interleaved sampling circuit, in accordance with certain aspects of the present disclosure.
Figure 6:
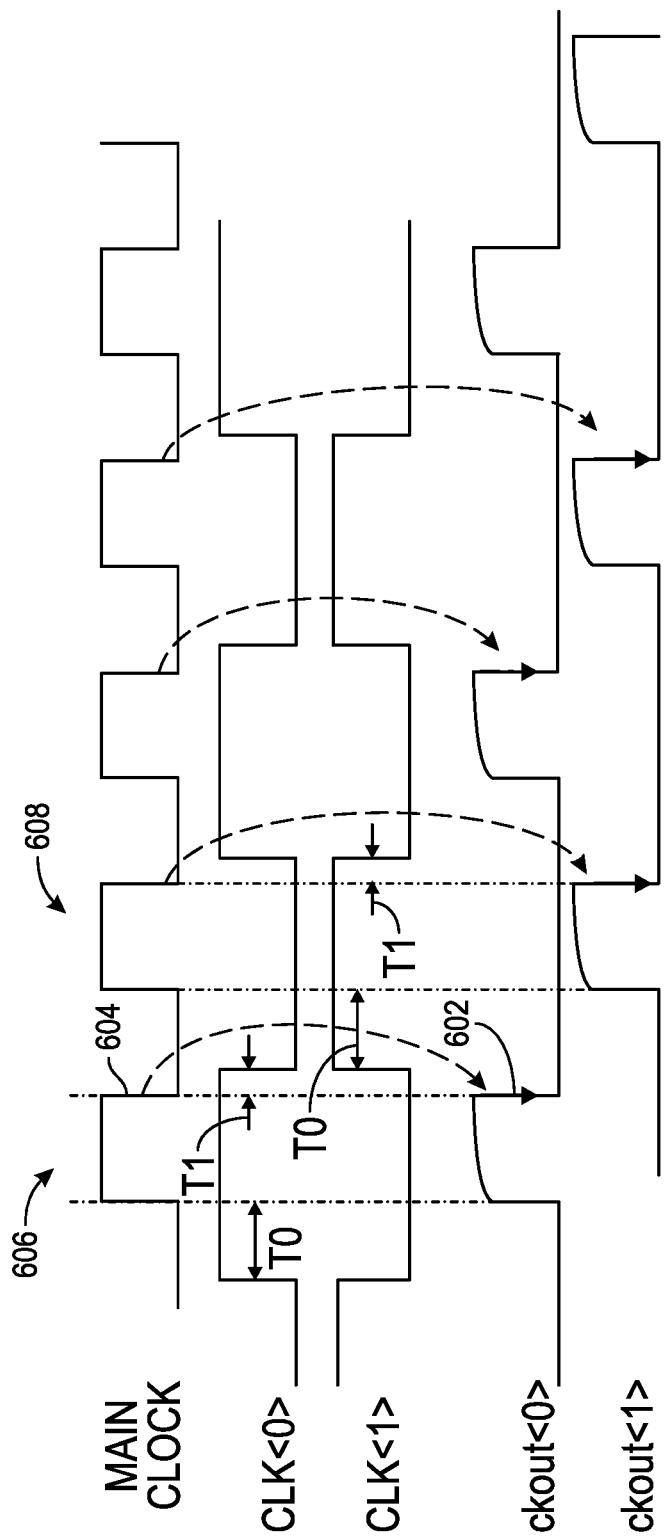
FIG. 6 is a timing diagram illustrating various clock signals used to operate an interleaved sampling circuit, in accordance with certain aspects of the present disclosure.

FIG. 5 illustrates an example interleaved sampling circuit 500 for quantizers, in accordance with certain aspects of the present disclosure. FIG. 6 is a timing diagram illustrating various clock signals used to operate the sampling circuit 500, in accordance with certain aspects of the present disclosure.

As shown in FIG. 5, the circuit 500 may include multiple sampling circuits 502, 504 that may sample an input voltage (Vin) in an interleaved manner, as described herein. While the circuitry associated with circuit 502 is shown, the circuit 504 may be implemented in a similar manner. The circuit 500 may include a clock generator 506 for generating clock signals CLK<0> and CLK<1> provided to respective sampling circuits 502, 504, as shown.

As shown, the main clock signal (labeled "MAIN CLOCK") may be received by the clock generator 506, based on which the clock generator may generate non-overlapping clock signals CLK<0> and CLK<1>. Some sampling circuits may operate based solely on CLK<0> and CLK<1> for clocking. Thus, such sampling circuits may have degraded performance due to the skew of CLK<0> and CLK<1> generated by the clock generator. Further timing skew may be present due to mismatch caused by logic used to generate repeated versions of CLK<0> and CLK<1 for the sampling. Some such sampling circuits also generate delayed signals for the sampling operation, which also contribute to timing skews causing performance degradation.

In certain aspects of the disclosure, in addition to CLK<0> and CLK<1> provided to the circuits 502, 504, the main clock signal is also more directly provided (e.g., through respective circuitry 590, 592, which may be a bootstrap switch network providing high linearity) to the sampling circuits 502, 504 to improve skew as compared to some conventional implementations. The clock signals CLK<0> and CLK<1> may be used to select a portion of the main clock signal to drive a sampling switch, as described in more detail herein.

As shown, the sampling circuit 502 may include a sampling transistor Min (e.g., sampling switch) coupled between an input voltage (Vin) node and a sampling capacitive element (e.g., a capacitive digital-to-analog converter (CDAC)) coupled in shunt to an input of a quantizer 508. The sampling transistor Min may be turned on, electrically coupling the Vin node to the CDAC to sample Vin on the CDAC. The sampling transistor Min may be driven by a ckout<0> signal, as shown. The sampled voltage may be converted to a digital signal via the quantizer 508.

The main clock signal may directly (or at least more directly) drive the falling edge of the ckout<0> signal, as shown in FIG. 6. That is, the falling edge 604 of the main clock signal may cause the falling edge 602 of the ckout<0> signal. Thus, the main clock signal drives the falling edge of the sampling instance (e.g., turning off transistor Min to end the sampling of Vin) via a transistor M10x shown in FIG. 5. In this manner, the skew of the multiple channels (e.g., sampling circuits 502, 504) may only be due to the device mismatch of transistor M10x, reducing the effect of timing skew as compared to some conventional implementations. As shown, the main clock signal may be provided to an input of inverter 510 to generate a complementary main clock signal (labeled "MAIN CKB"). MAIN CKB is used to drive a gate of transistor M10x, having a source coupled to a reference potential node (e.g., electric ground) and a drain coupled to a node 514.

CLK<0> may be provided to an inverter 512 to generate a complementary CLK<0> signal labeled "CLKB<0>." As shown, a transistor M10 may have a source coupled to the reference potential node and a drain coupled to the node 514. A gate of transistor M10 may be driven by the CLKB<0> signal. Transistor M9 may have a drain coupled to node 514 and a source coupled to the drain of transistor M9x, where the source of transistor M9x is coupled to a voltage rail Vdd. As shown, a gate of transistor M9 may be driven by the CLKB<0> signal, and a gate of transistor M9x may be driven by the MAIN CKB signal. In effect, the transistors M9x, M9, M10, and M10x implement a NOR gate performing a NOR operation of the MAINCKB and CLKB<0> signals (or the transistors M9x, M9, M10, and M10x along with inverters 510, 512 implement a NAND gate performing a NAND operation of the MAIN CLOCK and CLK<0> signals). That is, when both the MAINCKB and CLKB<0> signals are logic low (or MAIN CLOCK and CLK<0> signals are logic high), the voltage at node 514 transitions to logic high as shown in FIG. 6. Similarly, when the MAINCKB or CLKB<0> signal is logic high (or MAIN CLOCK or CLK<0> signal is logic low), the voltage at node 514 transitions to logic low. As shown, the node 514 is coupled to a gate of transistor Min at sampling node 515 through a transistor Md having a gate coupled to Vdd. The ckout<0> signal is generated at node 515 at the gate of transistor Min. When the ckout<0> signal transitions to logic high, transistor Min is turned on, starting the sampling phase of the circuit 502. As shown, bulks of transistors M9 and M9x are coupled to the voltage rail Vdd.

During a sampling phase, the voltage at node 515 may be equal to the sum of Vin and Vdd multiplied by k, where k is a boost efficiency factor. For the case when Vin is equal to zero, the voltage at the source of transistor Md may be equal to Vdd multiplied by k, which is lower than Vdd, while the gate of the transistor Md may be at Vdd. Therefore, in order for transistor Md to be turned off, the gate to source voltage of transistor Md has to be zero (or less than zero). Thus, the node 514 may be pulled to Vdd using transistor M9 and M9x.

In some aspects, a transistor M7 is coupled between the sampling node 515 and a positive boost capacitor (labeled "bstcap_p") node. For example, a drain of transistor M7 may be coupled to the sampling node 515, and a source of transistor M7 may be coupled to the bstcap_p node. When the voltage at node 514 is logic low, transistor M7 may be turned off so that the ckout<0> signal can transition to logic low. To turn off transistor M7, the node 516 at a gate of transistor M7 may be coupled to Vdd via transistors M3 and M3x. For example, the gate of transistor M3x may receive the main clock signal, and transistor M3 may receive the CLK<0> signal. Thus, when the main clock signal or the CLK<0> signal is logic low, transistors M3x and M3 may be turned on, coupling the node 516 to Vdd and turning off transistor M7.

To turn on transistor M7, transistors M4 and M4x may be turned on. As shown, a gate of transistor M4 may receive the main clock signal, and a gate of transistor M4x may receive the CLK<0> signal. When the main clock signal and the CLK<0> signal are logic high, transistors M4 and M4x are turned on, coupling the node 516 to a negative boost capacitor (bstcap_n) node. The bstcap_n node may be coupled to the Vin node through a transistor M12. For instance, the ckout<0> signal may be provided to a gate of transistor M12 having a drain coupled to the Vin node and a source coupled to the bstcap_n. Thus, when the ckout<0> signal is logic high (e.g., when the main clock signal and the CLK<0> signal are logic high), transistor M12 is turned on, coupling the bstcap_n signal to the Vin node. As shown, the ckout<0> signal may also be provided to the gate of transistor M5 having a drain coupled to the gate of transistor M7 and a source coupled to the bstcap_n signal. Transistor M5 may also be turned on when the ckout<0> signal is logic high, coupling the gate of transistor M7 to the bstcap_n node.

A bstcap_p voltage may be generated at the bstcap_p node, where the bstcap_p voltage may be equal to Vin plus Vdd using transistors M6 and M6x. For example, during a first phase when the MAIN CKB signal and/or the CLKB<0> signal is logic high, transistor M6 and/or M6x is turned on, coupling a first terminal of capacitive element C3 to the reference potential node (Vss). Moreover, transistor M2 may be turned on, coupling a second terminal of capacitive element C3 to Vdd, charging the capacitive element C3 to Vdd. During a second phase when MAIN CKB signal and CLKB<0> are logic low, the capacitive element C3 is coupled between the bstcap_n node (e.g., coupled to the Vin node through transistor M12) and the bstcap_p node, effectively summing the voltages Vin with the voltage on the capacitive element C3 (Vdd) to generate the voltage (Vin plus Vdd) at the bstcap_p node during the sampling phase (e.g., when ckout<0> is logic high). Transistor M2 may be turned off during the second phase. After the second phase, transistor M6x may be turned on again (e.g., with CLKB<0> transitioning to logic high), resetting the voltage on capacitive element C3 to Vdd (e.g., during a reset phase).

To drive transistor M2, the circuit 502 may include a voltage doubler circuit 520. The voltage doubler circuit 520 may include cross-coupled transistors M0 and M1, where a gate of transistor M0 is coupled to a source of transistor M1 and a gate of transistor M1 is coupled to a source of transistor M0. Drains of transistors M0 and M1 are coupled to the voltage rail Vdd. As shown, a first terminal of a capacitive element C1 may be coupled to the source of transistor M0, and a first terminal of a capacitive element C2 may be coupled to the source of transistor M1. The CLKB<0> signal may be provided to a second terminal of capacitive C1, and a signal (labeled "MAIN CLOCK+ CLK<0>") representing the overlap between the main clock signal and CLK<0> signal (e.g., a signal generated using an AND operation on the main clock signal and the CLK<0> signal) may be provided to a second terminal of the capacitive element C2. During a first phase when transistor M0 is turned on and the CLKB<0> signal is logic low, the capacitive element C1 is charged to Vdd. During a second phase when the transistor M0 is turned off and the CLKB<0> signal is logic high (e.g., at Vdd), a voltage that is twice Vdd (e.g., Vdd from the CLKB<0> signal plus the Vdd stored on capacitive element C1 during the first phase) may be provided to the gate of transistor M1 which is also coupled to the gate of transistor M2.

As shown in FIG. 6, the MAIN CLOCK signal may have rising and falling edges that occur at different times than rising and falling edges of the CLK<0> and CLK<1> signals. That is, the rising edge of the CLK<0> signal may occur a time period T0 before the rising edge of the MAIN CLOCK signal, and the falling edge of the MAIN CLOCK signal may occur a time period T1 (e.g., where T1 is greater than 0) before the falling edge of the CLK<0> signal. The non-overlapping relationship is implemented via the clock generator 506 so that the sampling edge (e.g., corresponding to the falling edge 604 of the MAIN CLOCK signal that freezes the sampled voltage on the CDAC) is determined by the edge of the MAIN CLOCK signal. While an example implementation is shown with the sampling edge being a falling edge of the MAIN CLOCK signal to facilitate understanding, the sampling edge may be a rising edge of the MAIN CLOCK signal in some implementations (e.g., an implementation without the inverter 510 used to generate the MAIN CKB signal from the MAIN CLOCK signal).

A similar circuit topology may be implemented for circuit 504. For example, as shown in FIG. 6, while the circuit 502 generates the ckout<0> signal for sampling based on the pulse 606, the circuit 504 may generate the ckout<1> signal for sampling based on the pulse 608 to implement sampling in an interleaved manner.

Figure 7:
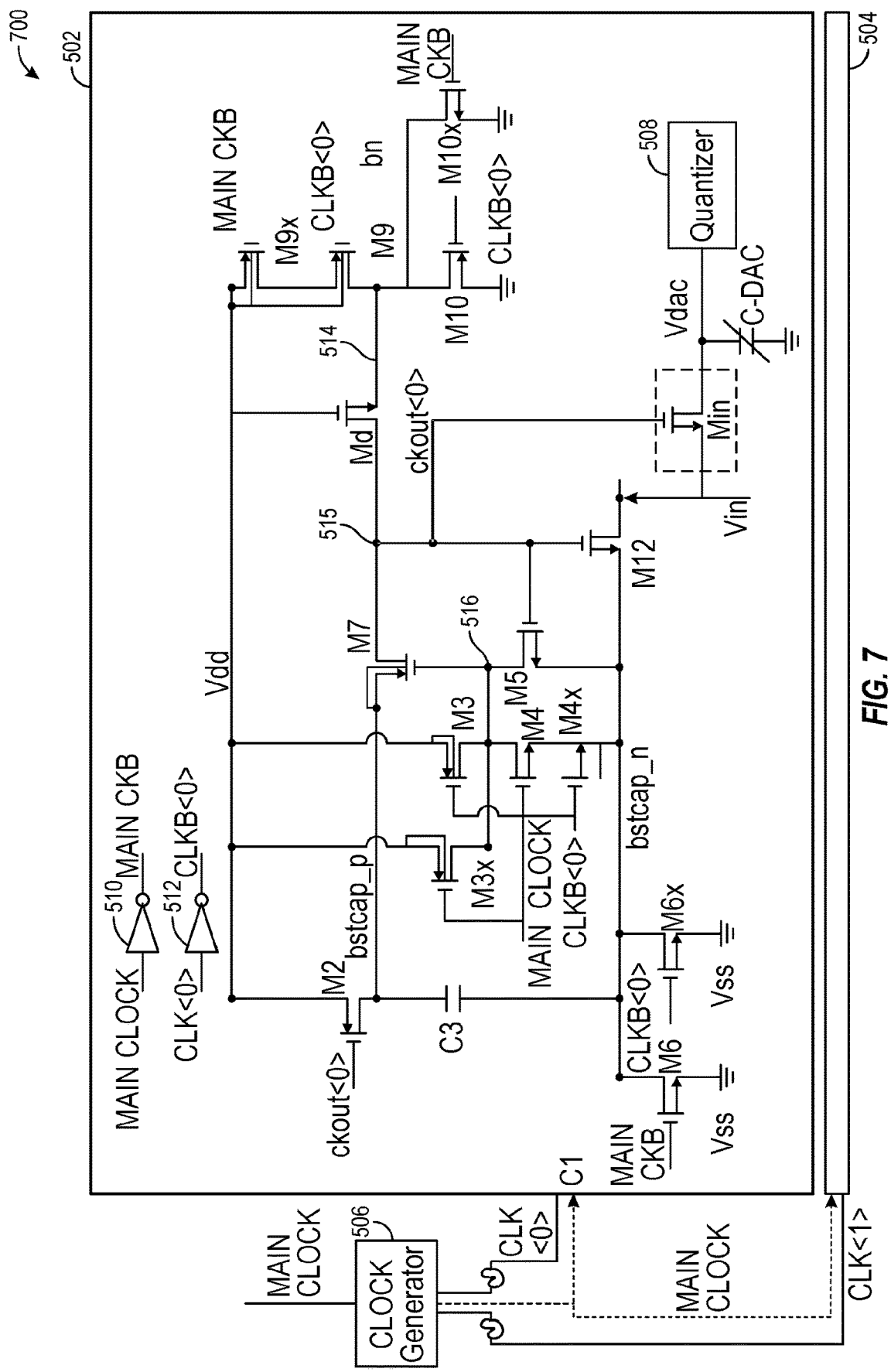
FIG. 7 illustrates an example interleaved sampling circuit implemented without voltage doubler circuits, in accordance with certain aspects of the present disclosure.

FIG. 7 illustrates an example sampling circuit 700 implemented without voltage doubler circuits (e.g., voltage doubler circuit 520), in accordance with certain aspects of the present disclosure. As shown, the ckout<0> signal may be provided to the gate of transistor M2, implemented as a p-type field-effect transistor (PFET) (e.g., a p-type metal-oxide-semiconductor (PMOS) transistor) here, rather than as an n-type transistor. Thus, during the sampling phase when the ckout<0> signal is logic high, transistor M2 may be turned off. Transistor M2 may be turned on when the ckout<0> signal is logic low.

Figure 8:
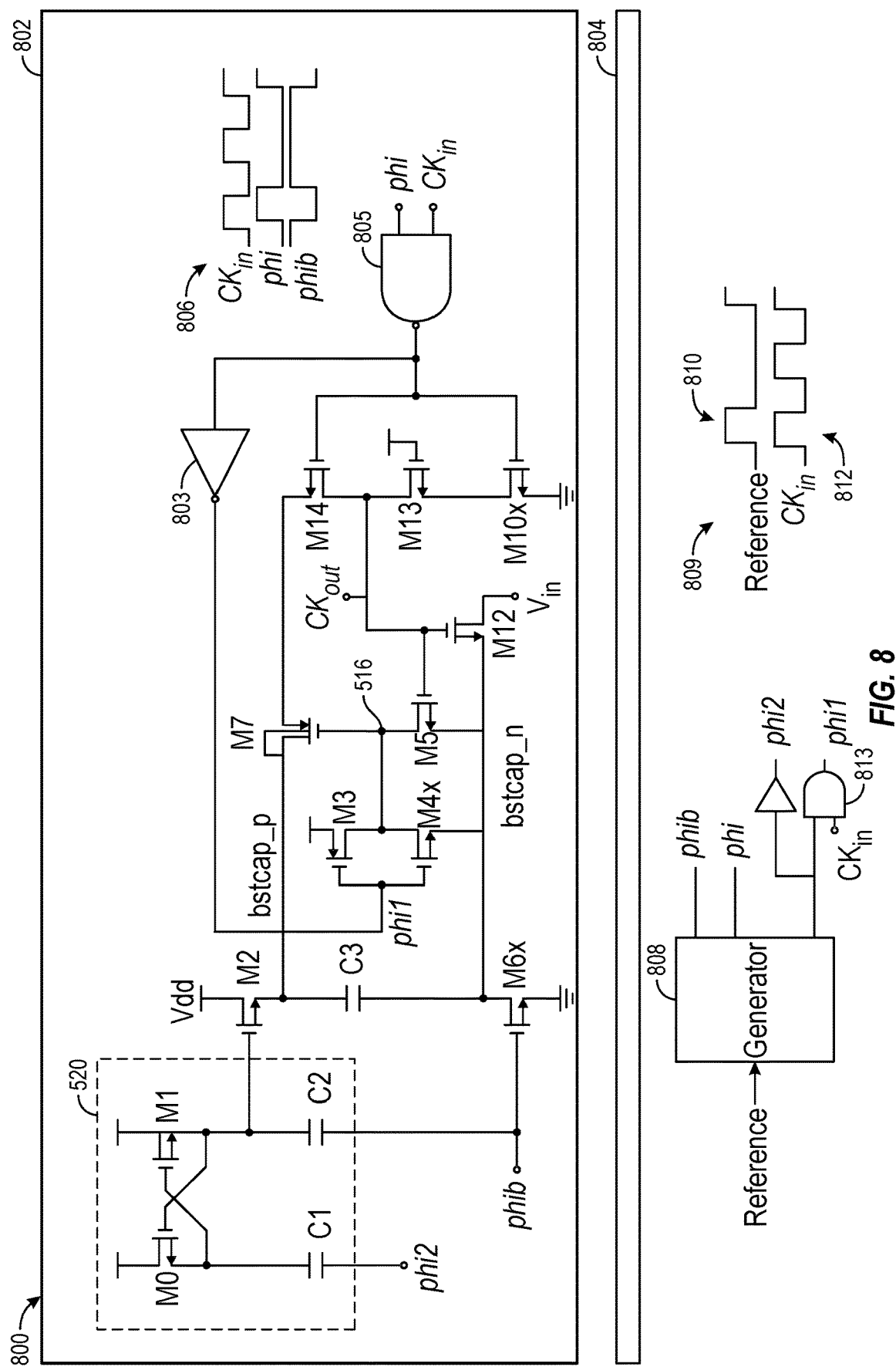
FIG. 8 illustrates an interleaved sampling circuit having sampling circuits, each implemented using a not-AND (NAND) gate, in accordance with certain aspects of the present disclosure.

FIG. 8 illustrates an interleaved sampling circuit 800 having sampling circuits 802, 804 each implemented using a not-AND (NAND) gate 805, in accordance with certain aspects of the present disclosure. As shown, a clock generator 808 (e.g., corresponding to the clock generator 506 shown in FIG. 5) may be used to generate a phi signal (e.g., a clock signal having a reference phase). In some aspects, the clock generator 808 may generate the phi signal using a reference signal. The reference signal may be provided to the clock generator 808. As shown in timing diagram 809, the reference signal may include a pulse (e.g., pulse 810) for every other pulse (e.g., pulse 812) of an input clock ($CK_{in}$) signal (e.g., a main clock signal). For instance, the rising edge of pulse 810 may be delayed from the rising edge of pulse 812, and the falling edge of pulse 810 may be delayed from the falling edge of pulse 812. The $CK_{in}$ signal may correspond to the main clock signal described with respect to FIGS. 5-7, where the $CK_{in}$ signal may be provided to each of the sampling circuits. As shown, based on the reference signal, phi and complementary phi (labeled "phib") signals may be generated. As shown in timing diagram 806, the phi signal may include a delayed pulse for every other pulse of the $CK_{in}$ signal similar to the reference signal, and the phib signal may be complementary to the phi signal. As shown, the circuit 800 may include a NAND gate 805 that receives the $CK_{in}$ signal and the phi signal. The output of the NAND gate 805 may be coupled to the gate of transistor M10x having a source coupled to the reference potential node and a drain coupled to a source of transistor M13. The gate of transistor M13 may be biased using Vdd. The drain of transistor M13 may be coupled to an output clock ($CK_{out}$) node. The $CK_{out}$ signal at the $CK_{out}$ node may correspond to the ckout<0> signal described with respect to FIGS. 5-7 and used to control a sampling switch (e.g., such as the sampling transistor $M_{in}$ shown in FIG. 5 used to sample Vin). As shown, the $CK_{out}$ node may be coupled to a drain of transistor M14, where a gate of transistor M14 is coupled to the output of the NAND gate 805. A source of transistor M14 may be coupled to the source of transistor M7, where the drain of transistor M7 is coupled to the bstcap_p node. When the phi and $CK_{in}$ signals are logic high, transistor M14 is turned on. As shown, an inverter 803 may be coupled between the output of the NAND gate 805 and the gates of transistors M3 and M4x. The source of transistor M3 is coupled to the voltage rail Vdd, and the source of transistor M4x is coupled to the bstcap_n node. The drains of transistors M3 and M4x are coupled to the gate of transistor M7. Thus, when the phi and $CK_{in}$ signals are logic high, transistor M4x is turned on such that the voltage at node 516 is equal to a bstcap_n voltage at the bstcap_n node, turning on transistor M7 to facilitate the transition of the $CK_{out}$ signal to logic high. As described, with transistor M12 being turned on, the bstcap_n voltage may be equal to Vin.

As shown, to generate the bstcap_p signal, the sampling circuit 800 may include transistor M6x having a drain coupled to the bstcap_n node. The capacitive element C3 is coupled between the drain of transistor M6x and the source of transistor M2. A voltage doubler circuit 520 may be used to bias transistor M2, as described herein. As shown, the capacitive element C1 may receive a phi2 signal (e.g., a buffered version of the phi signal), and the capacitive element C2 and the gate of transistor M6x may receive the phib signal. The voltage doubler circuit 520, transistors M6x and M2, and capacitive element C3 may be used to generate the bstcap_p signal, which may be equal to Vin plus Vdd in a similar manner as described with respect to FIG. 5. In some aspects, instead of using the inverter 803, the phi1 signal may be generated by performing an AND operation (e.g., via AND gate 813) of the phi signal and the $CK_{in}$ signal, as shown.

Example Operations for Interleaved Sampling

Figure 9:
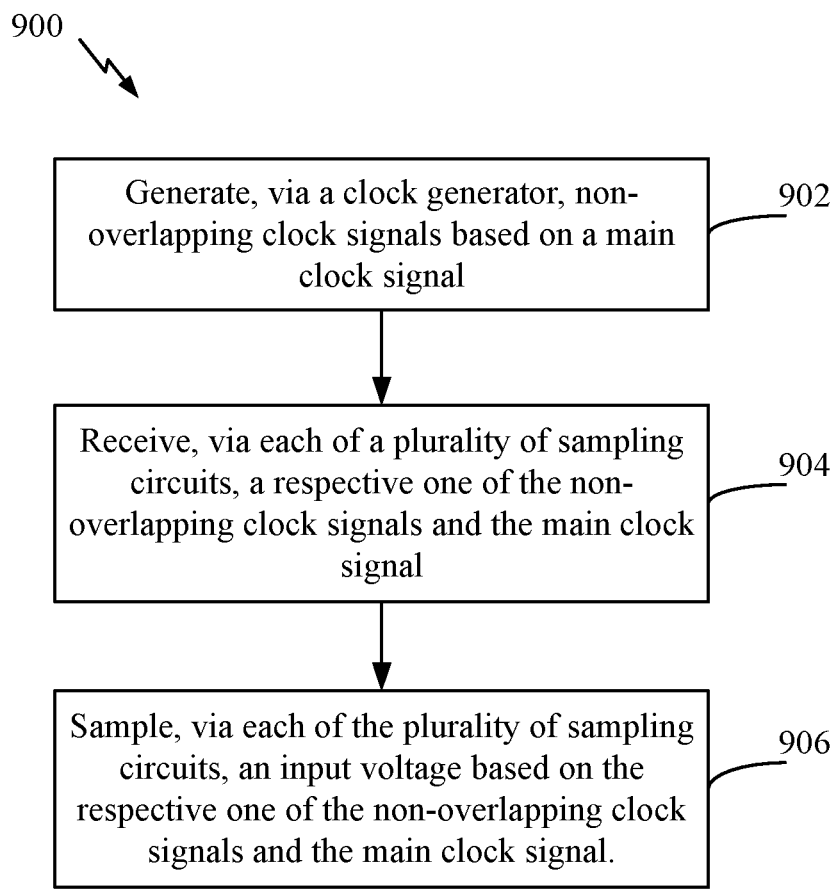
FIG. 9 is a flow diagram illustrating example operations for interleaved sampling, in accordance with certain aspects of the present disclosure.

FIG. 9 is a flow diagram illustrating example operations 900 for interleaved sampling, in accordance with certain aspects of the present disclosure. The operations 900 may be performed, for example, by an interleaved sampling circuit, such as the circuit 500, 700 or 800.

At block 902, the interleaved sampling circuit may generate, via a clock generator (e.g., clock generator 506 or 808), non-overlapping clock signals (e.g., CLK<0> and CLK<1> of FIGS. 5 and 7, or the phi signal of FIG. 8) based on a main clock signal. In some aspects, the non-overlapping clock signals have non-overlapping pulses. A rising edge and a falling edge of the non-overlapping clock signals may occur at different times than a rising edge and a falling edge of the main clock signal.

At block 904, the interleaved sampling circuit receives, via each of a plurality of sampling circuits (e.g., sampling circuits 502, 504 or sampling circuits 802, 804), a respective one of the non-overlapping clock signals and the main clock signal.

At block 906, the interleaved sampling circuit samples, via each of the plurality of sampling circuits, an input voltage (e.g., Vin) based on the respective one of the non-overlapping clock signals and the main clock signal.

In some aspects, the interleaved sampling circuit may receive the main clock signal at a gate of a first transistor (e.g., transistor M10x of FIG. 5) of each of the plurality of sampling circuits. The interleaved sampling circuit may generate an output clock signal (e.g., ckout<0>) at an output clock node coupled to a drain of the first transistor based on the main clock signal. The input voltage may be sampled via a sampling switch (e.g., transistor Min) having a control input coupled to the output clock node.

In some aspects, each of the plurality of sampling circuits includes a capacitive element (e.g., a CDAC) coupled to the sampling switch. A quantizer (e.g., quantizer 508) may be coupled to the capacitive element.

In some aspects, the interleaved sampling circuit may receive a signal complementary to the respective one of the non-overlapping clock signals at a gate of a second transistor (e.g., transistor M10) of each of the plurality of sampling circuits. A drain of the second transistor may be coupled to the output clock node.

In some aspects, the interleaved sampling circuit may receive a signal complementary to the respective one of the non-overlapping clock signals at a gate of a second transistor (e.g., transistor M9) of each of the plurality of sampling circuits. The interleaved sampling circuit may receive a signal complementary to the main clock signal at a gate of a third transistor (e.g., transistor M9x) at a gate of a third transistor of each of the plurality of sampling circuits. The second transistor and the third transistor may be between a voltage rail (e.g., Vdd) and the output clock node.

In some aspects, each of the plurality of sampling circuits may include a second transistor (e.g., transistor M7) coupled between an output clock node and a boosted voltage node (e.g., bstcap_p node). Each of the plurality of sampling circuits may include a third transistor (e.g., transistor M4, M4x, or M5) coupled between a gate of the second transistor and a bias voltage node (e.g., bstcap_n node).

In some aspects, the interleaved sampling circuit may receive the main clock signal at a gate of the third transistor (e.g., transistor M4). The interleaved sampling circuit may receive the respective one of the non-overlapping clock signals at a gate of a fourth transistor (e.g., transistor M4x) coupled between the gate of the second transistor and the bias voltage node.

In some aspects, each of the plurality of sampling circuits may include a fourth transistor (e.g., transistor M12) coupled between the bias voltage node and an input voltage node. In some aspects, each of the plurality of sampling circuits may include a fourth transistor (e.g., transistor M6 or M6x) coupled between the bias voltage node and a reference potential node, a capacitive element (e.g., capacitive element C3) coupled between the boosted voltage node and the bias voltage node, and a fifth transistor (e.g., transistor M2) coupled between the boosted voltage node and a voltage rail.

In some aspects, the interleaved sampling circuit may receive a signal complementary to the main clock signal at a gate of the fourth transistor (e.g., transistor M6). The interleaved sampling circuit may receive a signal complementary to the respective one of the non-overlapping clock signals at a gate of a sixth transistor (e.g., transistor M6x) coupled between the bias voltage node and the reference potential node.

In some aspects, the interleaved sampling circuit may generate, via a voltage doubler circuit (e.g., circuit 520), a bias voltage provided to a gate of the fifth transistor. In some aspects, the interleaved sampling circuit generates, via each of the plurality of sampling circuits, an output clock signal (e.g., ckout<0> of FIG. 7) to sample the input voltage based on the main clock signal and the respective one of the non-overlapping clock signals. The interleaved sampling circuit may receive, at a gate of the fifth transistor (e.g., transistor M2), the output clock signal.

In some aspects, the interleaved sampling circuit may receive the main clock signal at a first input of a NAND gate (e.g., NAND gate 805 of FIG. 8). The interleaved sampling circuit may receive the respective one of the non-overlapping clock signals at a second input of the NAND gate, an output of the NAND gate being coupled to a gate of a transistor (e.g., transistor M10x) having a drain coupled to an output clock node (e.g., $CK_{out}$ node), each of the plurality of sampling circuits having a sampling switch (e.g., corresponding to the transistor Min of FIG. 5) having a control input coupled to the output clock node.

Example Aspects

In addition to the various aspects described above, specific combinations of aspects are within the scope of the present disclosure, some of which are detailed below:

Aspect 1: An interleaved sampling circuit, comprising: a clock generator having an input coupled to a main clock node and having a plurality of non-overlapping clock output nodes; and a plurality of sampling circuits, each of the plurality of sampling circuits having a first clock input coupled to a respective one of the non-overlapping clock output nodes and a second clock input coupled to the main clock node.

Aspect 2: The interleaved sampling circuit of Aspect 1, wherein each of the plurality of sampling circuits comprises: a first transistor having a gate coupled to the main clock node and a drain coupled to an output clock node; and a sampling switch having a control input coupled to the output clock node.

Aspect 3: The interleaved sampling circuit of Aspect 2, wherein each of the plurality of sampling circuits is coupled to an input voltage node and further comprises: a capacitive element coupled to the sampling switch; and a quantizer coupled to the capacitive element, the sampling switch being coupled between the input voltage node and the quantizer.

Aspect 4: The interleaved sampling circuit of Aspect 2 or 3, wherein each of the plurality of sampling circuits further comprises a second transistor having a gate configured to receive a signal complementary to a respective one of non-overlapping clock signals at the respective one of the non-overlapping clock output nodes and a drain coupled to the output clock node.

Aspect 5: The interleaved sampling circuit according to any of Aspects 2-4, wherein each of the plurality of sampling circuits further comprises: a second transistor having a gate configured to receive a signal complementary to a respective one of non-overlapping clock signals at the respective one of the non-overlapping clock output nodes; and a third transistor having a gate configured to receive a signal complementary to a main clock signal at the main clock node, the second transistor and the third transistor being coupled in series between a voltage rail and the output clock node.

Aspect 6: The interleaved sampling circuit according to any of Aspects 2-5, wherein each of the plurality of sampling circuits further comprises: a second transistor coupled between the output clock node and a boosted voltage node; and a third transistor coupled between a gate of the second transistor and a bias voltage node.

Aspect 7: The interleaved sampling circuit of Aspect 6, wherein a gate of the third transistor is coupled to the main clock node, each of the plurality of sampling circuits further comprising a fourth transistor configured to receive a respective one of non-overlapping clock signals at the respective one of the non-overlapping clock output nodes.

Aspect 8: The interleaved sampling circuit of Aspect 6 or 7, wherein each of the plurality of sampling circuits further comprises a fourth transistor coupled between the bias voltage node and an input voltage node for the sampling circuit.

Aspect 9: The interleaved sampling circuit according to any of Aspects 6-8, wherein each of the plurality of sampling circuits further comprises: a fourth transistor coupled between the bias voltage node and a reference potential node; a capacitive element coupled between the boosted voltage node and the bias voltage node; and a fifth transistor coupled between the boosted voltage node and a voltage rail.

Aspect 10: The interleaved sampling circuit of Aspect 9, wherein: a gate of the fourth transistor is configured to receive a signal complementary to a main clock signal at the main clock node; each of the plurality of sampling circuits further comprises a sixth transistor coupled between the bias voltage node and the reference potential node; and a gate of the sixth transistor is configured to receive a signal complementary to a respective one of non-overlapping clock signals at the respective one of the non-overlapping clock output nodes.

Aspect 11: The interleaved sampling circuit of Aspect 9 or 10, further comprising a voltage doubler circuit having an output coupled to a gate of the fifth transistor.

Aspect 12: The interleaved sampling circuit according to any of Aspects 9-11, wherein a gate of the fifth transistor is coupled to the control input of the sampling switch.

Aspect 13: The interleaved sampling circuit according to any of Aspects 2-12, wherein each of the plurality of sampling circuits further comprises a NAND gate having a first input coupled to the main clock node and a second input coupled to the respective one of the non-overlapping clock output nodes, an output of the NAND gate being coupled to a gate of the first transistor.

Aspect 14: An interleaved sampling circuit, comprising: a clock generator configured to generate non-overlapping clock signals based on a main clock signal; and a plurality of sampling circuits, each of the plurality of sampling circuits being configured to: receive a respective one of the non-overlapping clock signals and the main clock signal;

and sample an input voltage based on the respective one of the non-overlapping clock signals and the main clock signal.

Aspect 15: The interleaved sampling circuit of Aspect 14, wherein the non-overlapping clock signals have non-overlapping pulses.

Aspect 16: The interleaved sampling circuit of Aspect 14 or 15, wherein a rising edge and a falling edge of a respective one of the non-overlapping clock signals occur at different times than a rising edge and a falling edge of the main clock signal.

Aspect 17: The interleaved sampling circuit according to any of Aspects 14-16, wherein each of the plurality of sampling circuits comprises: a first transistor having a gate configured to receive the main clock signal and a drain coupled to an output clock node; and a sampling switch having a control input coupled to the output clock node.

Aspect 18: The interleaved sampling circuit of Aspect 17, wherein each of the plurality of sampling circuits further comprises: a capacitive element coupled to the sampling switch; and a quantizer coupled to the capacitive element.

Aspect 19: The interleaved sampling circuit of Aspect 17 or 18, wherein each of the plurality of sampling circuits further comprises a second transistor having a gate configured to receive a signal complementary to the respective one of the non-overlapping clock signals and a drain coupled to the output clock node.

Aspect 20: The interleaved sampling circuit according to any of Aspects 17-19, wherein each of the plurality of sampling circuits further comprises: a second transistor having a gate configured to receive a signal complementary to the respective one of the non-overlapping clock signals; and a third transistor having a gate configured to receive a signal complementary to the main clock signal, the second transistor and the third transistor being between a voltage rail and the output clock node.

Aspect 21: The interleaved sampling circuit according to any of Aspects 17-20, wherein each of the plurality of sampling circuits further comprises: a second transistor coupled between an output clock node and a boosted voltage node; and a third transistor coupled between a gate of the second transistor and a bias voltage node.

Aspect 22: The interleaved sampling circuit of Aspect 21, wherein: a gate of the third transistor is configured to receive the main clock signal; and each of the plurality of sampling circuits further comprises a fourth transistor coupled between a gate of the second transistor and a bias voltage node and configured to receive the respective one of the non-overlapping clock signals.

Aspect 23: The interleaved sampling circuit of Aspect 21 or 22, wherein each of the plurality of sampling circuits further comprises a fourth transistor coupled between the bias voltage node and an input voltage node.

Aspect 24: The interleaved sampling circuit according to any of Aspects 21-23, wherein each of the plurality of sampling circuits further comprises: a fourth transistor coupled between the bias voltage node and a reference potential node; a capacitive element coupled between the boosted voltage node and the bias voltage node; and a fifth transistor coupled between the boosted voltage node and a voltage rail.

Aspect 25: The interleaved sampling circuit of Aspect 24, wherein: a gate of the fourth transistor is configured to receive a signal complementary to the main clock signal; each of the plurality of sampling circuits further comprises a sixth transistor coupled between the bias voltage node and the reference potential node; and a gate of the sixth transistor is configured to receive a signal complementary to the respective one of the non-overlapping clock signals.

Aspect 26: The interleaved sampling circuit of Aspect 24 or 25, further comprising a voltage doubler circuit having an output coupled to a gate of the fifth transistor.

Aspect 27: The interleaved sampling circuit according to any of Aspects 24-26, wherein: each of the plurality of sampling circuits is configured to generate an output clock signal to sample the input voltage based on the main clock signal and the respective one of the non-overlapping clock signals; and a gate of the fifth transistor is configured to receive the output clock signal.

Aspect 28: The interleaved sampling circuit according to any of Aspects 17-27, wherein each of the plurality of sampling circuits further comprises: a NAND gate having a first input configured to receive the main clock signal and a second input configured to receive the respective one of the non-overlapping clock signals, an output of the NAND gate being coupled to a gate of a transistor having a drain coupled to an output clock node; and a sampling switch having a control input coupled to the output clock node.

Aspect 29: A method for interleaved sampling, comprising: generating, via a clock generator, non-overlapping clock signals based on a main clock signal; receiving, via each of a plurality of sampling circuits, a respective one of the non-overlapping clock signals and the main clock signal; and sampling, via each of the plurality of sampling circuits, an input voltage based on the respective one of the non-overlapping clock signals and the main clock signal.

Aspect 30: The method of Aspect 29, wherein the non-overlapping clock signals have non-overlapping pulses.

Aspect 31: The method of Aspect 29 or 30, wherein a rising edge and a falling edge of a respective one of the non-overlapping clock signals occur at different times than a rising edge and a falling edge of the main clock signal.

Aspect 32: The method according to any of Aspects 29-31, further comprising: receiving the main clock signal at a gate of a first transistor of each of the plurality of sampling circuits; and generating an output clock signal at an output clock node coupled to a drain of the first transistor based on the main clock signal, wherein the input voltage is sampled via a sampling switch having a control input coupled to the output clock node.

Aspect 33: The method of Aspect 32, wherein each of the plurality of sampling circuits comprises: a capacitive element coupled to the sampling switch; and a quantizer coupled to the capacitive element.

Aspect 34: The method of Aspect 32 or 33, further comprising receiving a signal complementary to the respective one of the non-overlapping clock signals at a gate of a second transistor of each of the plurality of sampling circuits, wherein a drain of the second transistor is coupled to the output clock node.

Aspect 35: The method according to any of Aspects 32-34, further comprising: receiving a signal complementary to the respective one of the non-overlapping clock signals at a gate of a second transistor of each of the plurality of sampling circuits; and receiving a signal complementary to the main clock signal at a gate of a third transistor at a gate of a third transistor of each of the plurality of sampling circuits, the second transistor and the third transistor being between a voltage rail and the output clock node.

Aspect 36: The method according to any of Aspects 32-35, wherein each of the plurality of sampling circuits comprises: a second transistor coupled between an output clock node and a boosted voltage node; and a third transistor coupled between a gate of the second transistor and a bias voltage node.

Aspect 37: The method of Aspect 36, further comprising: receiving the main clock signal at a gate of the third transistor; and receiving the respective one of the non-overlapping clock signals at a gate of a fourth transistor coupled between the gate of the second transistor and the bias voltage node.

Aspect 38: The method of Aspect 36 or 37, wherein each of the plurality of sampling circuits further comprises: a fourth transistor coupled between the bias voltage node and an input voltage node.

Aspect 39: The method according to any of Aspects 36-38, wherein each of the plurality of sampling circuits further comprises: a fourth transistor coupled between the bias voltage node and a reference potential node; a capacitive element coupled between the boosted voltage node and the bias voltage node; and a fifth transistor coupled between the boosted voltage node and a voltage rail.

Aspect 40: The method of Aspect 39, further comprising: receiving a signal complementary to the main clock signal at a gate of the fourth transistor; and receiving a signal complementary to the respective one of the non-overlapping clock signals at a gate of a sixth transistor coupled between the bias voltage node and the reference potential node.

Aspect 41: The method of Aspect 39 or 40, further comprising generating, via a voltage doubler circuit, a bias voltage provided to a gate of the fifth transistor.

Aspect 42: The method according to any of Aspects 39-41, further comprising: generating, via each of the plurality of sampling circuits, an output clock signal to sample the input voltage based on the main clock signal and the respective one of the non-overlapping clock signals; and receiving, at a gate of the fifth transistor, the output clock signal.

Aspect 43: The method according to any of Aspects 32-42, further comprising: receiving the main clock signal at a first input of a NAND gate; and receiving the respective one of the non-overlapping clock signals at a second input of the NAND gate, an output of the NAND gate being coupled to a gate of a transistor having a drain coupled to an output clock node, each of the plurality of sampling circuits having a sampling switch having a control input coupled to the output clock node.

The above description provides examples, and is not limiting of the scope, applicability, or examples set forth in the claims. Changes may be made in the function and arrangement of elements discussed without departing from the scope of the disclosure. Various examples may omit, substitute, or add various procedures or components as appropriate. For instance, the methods described may be performed in an order different from that described, and various steps may be added, omitted, or combined. Also, features described with respect to some examples may be combined in some other examples. For example, an apparatus may be implemented or a method may be practiced using any number of the aspects set forth herein. In addition, the scope of the disclosure is intended to cover such an apparatus or method which is practiced using other structure, functionality, or structure and functionality in addition to, or other than, the various aspects of the disclosure set forth herein. It should be understood that any aspect of the disclosure disclosed herein may be embodied by one or more elements of a claim.

The various operations of methods described above may be performed by any suitable means capable of performing the corresponding functions. The means may include various hardware and/or software component(s) and/or module(s), including, but not limited to a circuit, an application-specific integrated circuit (ASIC), or processor. Generally, where there are operations illustrated in figures, those operations may have corresponding counterpart means-plus-function components.

As used herein, a phrase referring to "at least one of" a list of items refers to any combination of those items, including single members. As an example, "at least one of: a, b, or c" is intended to cover: a, b, c, a-b, a-c, b-c, and a-b-c, as well as any combination with multiples of the same element (e.g., a-a, a-a-a, a-a-b, a-a-c, a-b-b, a-c-c, b-b, b-b-b, b-b-c, c-c, and c-c-c or any other ordering of a, b, and c).

The methods disclosed herein comprise one or more steps or actions for achieving the described method. The method steps and/or actions may be interchanged with one another without departing from the scope of the claims. In other words, unless a specific order of steps or actions is specified, the order and/or use of specific steps and/or actions may be modified without departing from the scope of the claims.

It is to be understood that the claims are not limited to the precise configuration and components illustrated above. Various modifications, changes, and variations may be made in the arrangement, operation, and details of the methods and apparatus described above without departing from the scope of the claims.

The invention claimed is:

1. An interleaved sampling circuit, comprising:
a clock generator having an input coupled to a main clock node and having a plurality of non-overlapping clock output nodes; and
a plurality of sampling circuits, each of the plurality of sampling circuits having a first clock input coupled to a respective one of the non-overlapping clock output nodes and a second clock input coupled to the main clock node, wherein each of the plurality of sampling circuits comprises:
a first transistor having a gate coupled to the main clock node and a drain coupled to an output clock node; and
a sampling switch having a control input coupled to the output clock node.

2. The interleaved sampling circuit of claim 1, wherein each of the plurality of sampling circuits is coupled to an input voltage node and further comprises:
a capacitive element coupled to the sampling switch; and
a quantizer coupled to the capacitive element, the sampling switch being coupled between the input voltage node and the quantizer.

3. The interleaved sampling circuit of claim 1, wherein each of the plurality of sampling circuits further comprises a second transistor having a gate configured to receive a signal complementary to a respective one of non-overlapping clock signals at the respective one of the non-overlapping clock output nodes and a drain coupled to the output clock node.

4. The interleaved sampling circuit of claim 1, wherein each of the plurality of sampling circuits further comprises:
a second transistor having a gate configured to receive a signal complementary to a respective one of non-overlapping clock signals at the respective one of the non-overlapping clock output nodes; and
a third transistor having a gate configured to receive a signal complementary to a main clock signal at the main clock node, the second transistor and the third transistor being coupled in series between a voltage rail and the output clock node.

5. The interleaved sampling circuit of claim 1, wherein each of the plurality of sampling circuits further comprises:
a second transistor coupled between the output clock node and a boosted voltage node; and
a third transistor coupled between a gate of the second transistor and a bias voltage node.

6. The interleaved sampling circuit of claim 5, wherein a gate of the third transistor is coupled to the main clock node, each of the plurality of sampling circuits further comprising a fourth transistor configured to receive a respective one of non-overlapping clock signals at the respective one of the non-overlapping clock output nodes.

7. The interleaved sampling circuit of claim 5, wherein each of the plurality of sampling circuits further comprises a fourth transistor coupled between the bias voltage node and an input voltage node for the sampling circuit.

8. The interleaved sampling circuit of claim 5, wherein each of the plurality of sampling circuits further comprises:
a fourth transistor coupled between the bias voltage node and a reference potential node;
a capacitive element coupled between the boosted voltage node and the bias voltage node; and
a fifth transistor coupled between the boosted voltage node and a voltage rail.

9. The interleaved sampling circuit of claim 8, wherein:
a gate of the fourth transistor is configured to receive a signal complementary to a main clock signal at the main clock node;
each of the plurality of sampling circuits further comprises a sixth transistor coupled between the bias voltage node and the reference potential node; and
a gate of the sixth transistor is configured to receive a signal complementary to a respective one of non-overlapping clock signals at the respective one of the non-overlapping clock output nodes.

10. The interleaved sampling circuit of claim 8, further comprising a voltage doubler circuit having an output coupled to a gate of the fifth transistor.

11. The interleaved sampling circuit of claim 8, wherein a gate of the fifth transistor is coupled to the control input of the sampling switch.

12. The interleaved sampling circuit of claim 1, wherein each of the plurality of sampling circuits further comprises a NAND gate having a first input coupled to the main clock node and a second input coupled to the respective one of the non-overlapping clock output nodes, an output of the NAND gate being coupled to a gate of the first transistor.

13. An interleaved sampling circuit, comprising:
a clock generator configured to generate non-overlapping clock signals based on a main clock signal; and
a plurality of sampling circuits, each of the plurality of sampling circuits being configured to:
receive a respective one of the non-overlapping clock signals and the main clock signal;
select a portion of the main clock signal to be used as a sampling edge based on the respective one of the non-overlapping clock signals; and
sample an input voltage based on the respective one of the non-overlapping clock signals and the main clock signal, wherein the input voltage is sampled based on the sampling edge.

14. The interleaved sampling circuit of claim 13, wherein the non-overlapping clock signals have non-overlapping pulses.

15. The interleaved sampling circuit of claim 13, wherein a rising edge and a falling edge of a respective one of the non-overlapping clock signals occur at different times than a rising edge and a falling edge of the main clock signal.

16. The interleaved sampling circuit of claim 13, wherein each of the plurality of sampling circuits comprises:
a first transistor having a gate configured to receive the main clock signal and a drain coupled to an output clock node; and
a sampling switch having a control input coupled to the output clock node.

17. The interleaved sampling circuit of claim 16, wherein each of the plurality of sampling circuits further comprises:
a capacitive element coupled to the sampling switch; and
a quantizer coupled to the capacitive element.

18. The interleaved sampling circuit of claim 16, wherein each of the plurality of sampling circuits further comprises a second transistor having a gate configured to receive a signal complementary to the respective one of the non-overlapping clock signals and a drain coupled to the output clock node.

19. A method for interleaved sampling, comprising:
generating, via a clock generator, non-overlapping clock signals based on a main clock signal;
receiving, via each of a plurality of sampling circuits, a respective one of the non-overlapping clock signals and the main clock signal;
selecting a portion of the main clock signal to be used as a sampling edge based on the respective one of the non-overlapping clock signals; and
sampling, via each of the plurality of sampling circuits, an input voltage based on the respective one of the non-overlapping clock signals and the main clock signal, wherein the input voltage is sampled based on the sampling edge.

* * * * *